United States Patent [19]

Yuda

[11] 4,079,488
[45] Mar. 21, 1978

[54] FAN WHEEL FOR BLOWER AND APPARATUS FOR MANUFACTURING SAME

[76] Inventor: Masao Yuda, 1-10, Uenosaka 2-chome, Toyonaka, Osaka, Japan

[21] Appl. No.: 739,945

[22] Filed: Nov. 8, 1976

Related U.S. Application Data

[62] Division of Ser. No. 646,650, Jan. 5, 1976.

[51] Int. Cl.² .................. B23P 15/04; B21H 7/16
[52] U.S. Cl. .................................................. 29/23.5
[58] Field of Search ............. 29/23.5; 416/178, 187; 269/48.1

[56] References Cited

U.S. PATENT DOCUMENTS

| | | | |
|---|---|---|---|
| 353,420 | 11/1886 | Monroe | 269/48.1 |
| 2,155,264 | 4/1939 | Freed | 29/23.5 |
| 2,864,087 | 12/1958 | Novinger et al. | 29/23.5 X |
| 2,914,316 | 11/1959 | Austin et al. | 29/23.5 X |
| 2,996,788 | 8/1961 | Austin et al. | 29/23.5 |
| 3,030,903 | 4/1962 | Morris | 269/48.1 |
| 3,031,995 | 5/1962 | Taylor, Jr. | 269/48.1 |

Primary Examiner—Othell M. Simpson
Assistant Examiner—Horace M. Culver
Attorney, Agent, or Firm—Bacon & Thomas

[57] ABSTRACT

Fan wheel comprising opposite end disks, intermediate disks interposed between the end disks at a specified spacing, and blades having a uniform section over the entire length thereof and extending through corresponding registered apertures formed in the outer peripheral portions of the disks. The apertures are circumferentially equidistantly arranged in each of the disks and coincide with the sectional shape of the blades. The blades are fixed with an adhesive to the disks at the portions thereof fitting in the disks.

1 Claim, 5 Drawing Figures

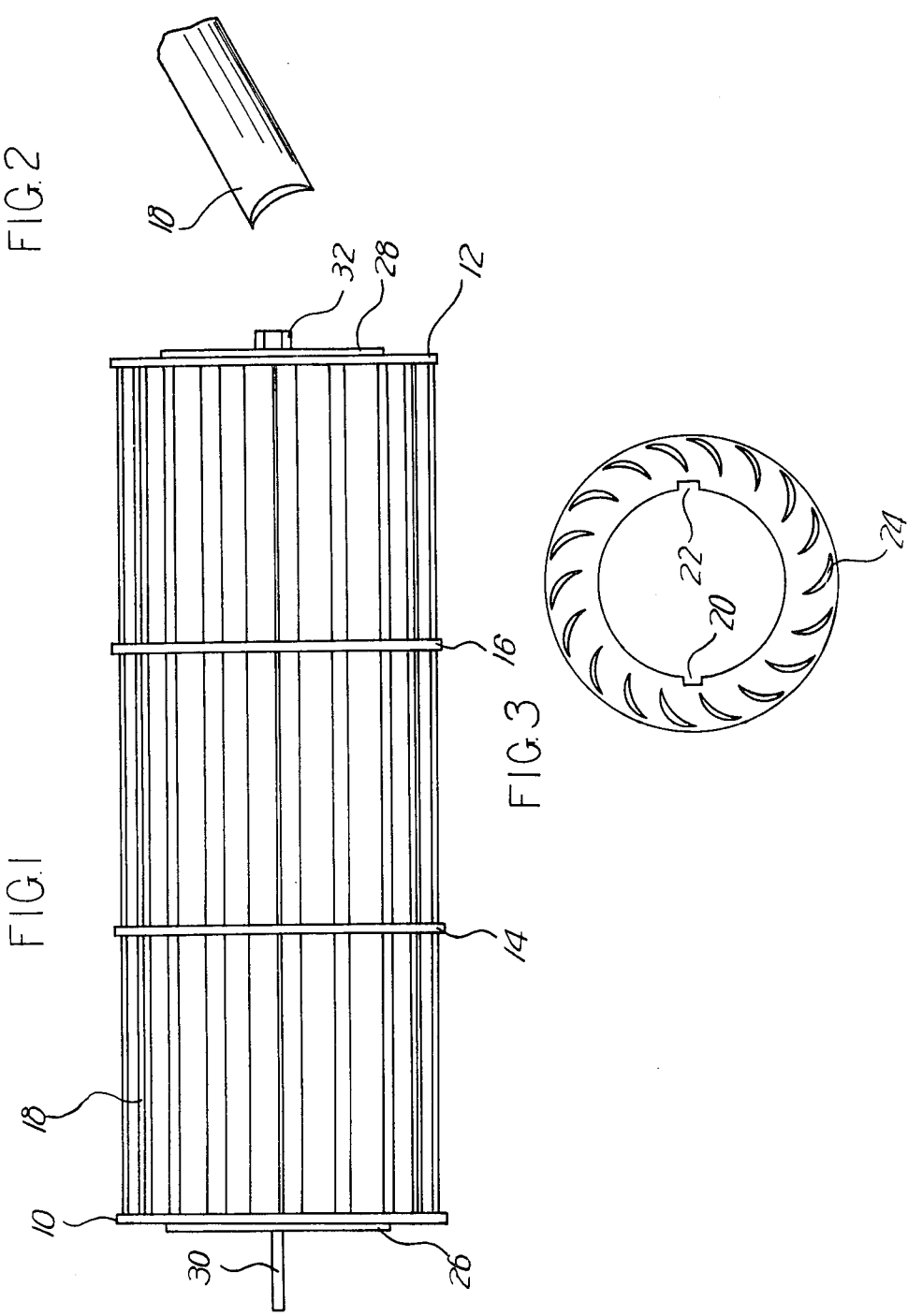

FAN WHEEL FOR BLOWER AND APPARATUS FOR MANUFACTURING SAME

This is a division, of application Ser. No. 646,650, filed Jan. 5, 1976.

BACKGROUND OF THE INVENTION

It is recently practiced to produce cylindrical fan wheels from synthetic resin by injection molding as disclosed in Japanese patent publication No. 48043/1972. To render the cylindrical fan wheel easy to assemble, the fan wheel comprises molded units joined together end-to-end in the axial direction to a specified length and each including a support disk and a predetermined number of blades arranged on one or both sides of the disk.

With such construction, however, the unit necessitates a complex and expensive die for molding, and the die must have such draft that the width and thickness of the blade will decrease progressively from its base portion to its end, as required by the injection molding operation. When the blades are thus longitudinally tapered, rotation of the fan wheel permits part of the air current to flow in the axial direction, entailing a pressure loss, and the fan wheel has another drawback that the joints between the units have low strength against vibration and other stress, especially against impact.

SUMMARY OF THE INVENTION

The present invention provides a fan wheel having the features that it is composed of synthetic resin parts, is very lightweight, comprises blades having a uniform section over the entire length thereof and including no joint, and is therefore free of the conventional drawback of being prone to damage when driven at high speeds.

More specifically, an object of this invention is to provide a lightweight fan wheel made of synthetic resin and having sufficient strength so as to be rotatable at high speeds free of separation and damage.

Another object of this invention is to provide a fan wheel of tough construction in which blades having a uniform section throughout the entire length thereof extend through disks provided at the opposite ends and intermediate portions of the fan wheel, the blades being joined to the disks with an adhesive where they extend through the disks.

Another object of this invention is to provide a fan wheel of such construction that it is amenable to alterations in the number of blades, the diameter and length of fan wheel and the angle at which the blades are attached to the disks, so that fan wheels of varying dimensions can be readily manufactured in quantities with use of the same blades, merely by designing and preparing disks of the desired diameter having the specified number and angle of blade apertures.

Still another object of this invention is to provide an apparatus of simple construction for manufacturing fan wheels with great ease.

Other objects of this invention will become apparent from the accompanying drawings and the following description.

BRIEF DESCRIPTION OF THE DRAWINGS

FIG. 1 is a front view showing a fan wheel according to this invention;

FIG. 2 is a perspective view of a blade;

FIG. 3 is a front view of a disk;

DESCRIPTION OF THE PREFERRED EMBODIMENTS

Figure 4:
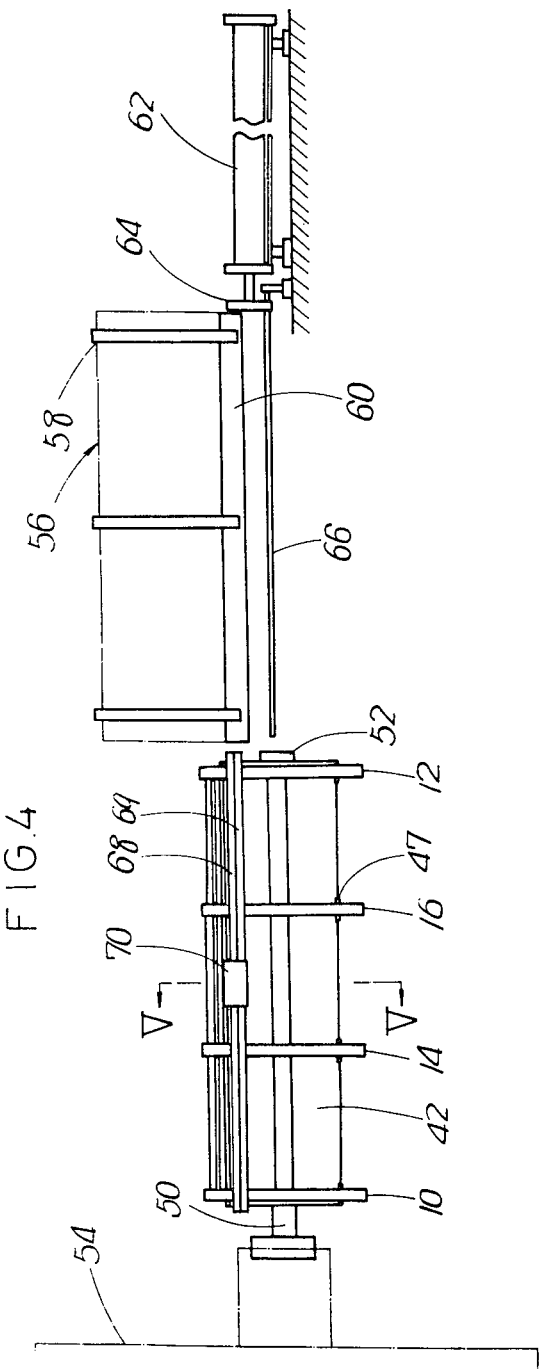
FIG. 4 is a front view showing an apparatus for manufacturing the fan wheel.

The drawings show a fan wheel in the form of an assembly comprising opposite end disks 10, 12, intermediate disks 14, 16 interposed between the end disks and arranged face-to-face at a specified spacing and a group of blades 18 extending through the disks. The disks are formed from synthetic resin by injection molding. Each of the blades 18 is also formed from synthetic resin by extrusion molding, draw molding, injection molding or some other method and has a uniform section throughout its entire length.

Each of the opposite end disks 10, 12 and intermediate disks 14, 16 is annular and has a circular central opening. The annular portion surrounding the opening is formed therethrough with blade apertures 24 coinciding with the cross sectional shape of the blade and arranged at the same pitch. The inner periphery of the annular disk has two diametrically opposed cutouts 20, 22. A number of the blades 18 respectively extend through corresponding aligned aperture 24 in the end disks 10, 12 and intermediate disks 14, 16 and are fixed to the disks with an adhesive applied to the portions where the blades 18 are fitted in the disks.

Side disks 26, 28 are attached to the outer side surfaces of the end disks. A shaft 30 for rotatably supporting the fan wheel is fixed to the center of the side disk 26, while a connector 32 fixedly fittable to the rotary shaft of an electric motor is secured to the center of the other side disk 28. In order to maintain the fan wheel in balance during high-speed rotation, a balance weight for fine adjustment may be provided on one of the blades.

Figure 5:
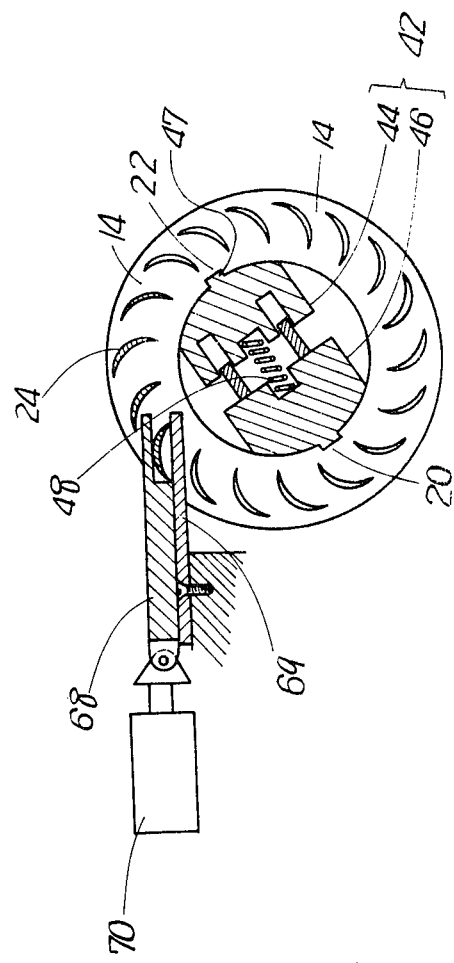
FIG. 5 is a view in section taken along the line V—V in FIG. 4.

FIGS. 4 and 5 schematically show an assembling apparatus for manufacturing fan wheels. An expandable and compressible holder 42 is fitted into the circular openings of disks 10, 12, 14 and 16 to hold the disks in phase. The holder 42 comprises a pair of support members 44, 46 having a length slightly greater than the entire length of the fan wheel and opposed to each other with springs 48 interposed therebetween to urge the support members away from each other and to thereby render the holder expandable and compressible. On the outer peripheral portions of the holder 42 where the holder retains the disks, the holder is formed with position-determining projections 47 coinciding with and engageable in the cutouts 20, 22 in the inner peripheries of the disks. Accordingly, the disks are brought into phase by inserting the support members 44, 46 into the circular openings of the disks while compressing the springs 48 and fitting the projections 47 into the cutouts 20, 22 upon releasing the support members, whereby the blade apertures 24 of one disk are registered with the corresponding apertures of another disk. The holder 42 has one end having a support rod 52 and the other end from which projects a shaft 50 fittingly connectable to drive means 54 which intermittently rotates the disks 10, 12, 14, and 16 in unison through an angle corresponding to the pitch of the blade arrangement at a time.

At the other end of the holder 42 opposed to the drive means 54, there is disposed a blade feeder 56 comprising a bottom plate 60 and pairs of guide plates 58 attached to the opposite sides of the bottom plate 60 and spaced by a distance corresponding to the width of the blades. Blades are stacked in the feeder 56 as directed in the same direction. The bottom plate 60 is formed with a slit in which the pushing plate 64 of a pusher 62 slidably engages.

The pusher 62 comprises pneumatic or hydraulic piston-and-cylinder means or some other reciprocating means for reciprocally moving the pushing plate 64 along a guide bar 66 to thereby force out the blades on the bottom plate 60 one after another from the lowermost position.

A movable guide plate 68 and a stationary guide plate 69, each having approximately the same length as the entire length of the fan wheel, are disposed in parallel to the holder 42 and close to the path of feed of the blade forced out by the pusher 62. The movable guide plate 68 is movable toward or away from the feed path. The movable plate 68 is positioned above the feed path, and the stationary plate 69 below the path. The movable plate 68 is coupled to withdrawing means 70 such as a solenoid and is thereby made movable outward from or into the fan wheel to be assembled. The pusher 62 and withdrawing means 70 are each operatively connected to the drive means 54. When the preparation for the assembling operation has been completed, with the disks mounted on the holder 42 and the shaft 50 connected to the drive means 54, the pusher 62 is initiated into operation, whereupon the pusher 62 forces out the lowermost blade 18 and inserts the blade into a group of the aligned or registered blade apertures 24 of the disks. The pair of guide plates 68, 69 hold the blade from above and below to prevent the blade from buckling when the front end of the blade 18 enters the apertures 24 of the disks. Upon the blade 18 fitting in the aperture in the foremost end disk 10, the withdrawing means 70 retracts the movable guide plate 68 and, at the same time, the pushing plate 64 is moved backward to the front end of the blade feeder 56. Subsequently, the drive means 54 rotates the set of disks through an angle corresponding to the pitch of the blade arrangement in a clockwise direction in FIG. 5, bringing the inserted blade 18 upward from the stationary guide plate 69. The blade inserting operation is thereafter repeated in the same manner as above.

When the blades 18 have been fitted into all blade apertures 24 of the disks, the holder 42 on the resulting fan wheel assembly is disconnected from the drive means 54 and the support member 44, 46 are withdrawn from the circular openings of the disks while corresponding the springs 48. An adhesive is applied to the portions where the blades fit in the end disks 10, 12 and intermediate disks 14, 16 to fix the blades to the disks. Side disks 26, 28 are adhered to the outer surfaces of end disks 10, 12 to close their openings. A shaft 30 is fixed to the side plate 26, and a connector 32 to be fixedly fitted to the drive shaft of an electric motor is secured to the other side plate 28, whereby a fan wheel is completed.

Because the fan wheel is composed of disks and blades molded from synthetic resin, it is lightweight, has a low inertia and is therefore rotatable at high speeds. Moreover, the blades which extend throughout the entire length of the fan wheel are unlikely to separate from the disks even when the wheel is driven at high speeds and are accordingly free of dropping, breakage or like accident. Because the blades have a uniform section over the entire length thereof, the blades will not produce an air current flowing axially thereof which is attendant to conventional fan wheels. According to this invention, a fan wheel of different length, diameter, blade pitch or blade angle can be readily produced with use of the same blades, merely by preparing end disks and intermediate disks of the required design. Thus the design of fan wheel of this invention is very easy to modify.

This invention is not limited to the foregoing description given with reference to the drawings. Various modifications will of course be apparent to one skilled in the art within the scope of this invention as defined in the appended claims.

I claim:

1. An apparatus for manufacturing a fan wheel by inserting blades into a pair of end disks and at least one intermediate disk through corresponding blade apertures formed therein each coinciding with the sectional shape of the blade, each of the disks having a circular central opening and an outer peripheral portion formed with the blade apertures at circumferentially equal spacing, comprising:
   a. support means having a length greater than the entire length of the fan wheel and diametrically compressible and expandable, the support means being insertable into the central openings of end disks and intermediate disks when compressed and being engageable with the inner peripheries of the disks defining the openings to prevent rotation of the disks when expanded,
   b. drive means connectable to the support means to intermittently rotate the support means through an angle corresponding to the pitch of the blade aperture arrangement at a time,
   c. feeding means for inserting a blade into each group of corresponding blade apertures of the disks to be supported by the support means,
   d. guide means including a guide plate having a length approximately equal to the entire length of the fan wheel and disposed in parallel to the path of feed of the blade, the guide plate being movable toward or away from the feed path, and
   e. guide plate driving means coupled to the guide plate and operable to retract the guide plate immediately before the drive means intermittently rotates the support means and to advance the guide plates to a position for guiding insertion of the blade when the drive means is brought out of rotation.

* * * * *